(12) United States Patent
Ono

(10) Patent No.: US 8,228,479 B2
(45) Date of Patent: Jul. 24, 2012

(54) LIQUID CRYSTAL DISPLAY WITH SPACERS ARRANGED CORRESPONDING TO METAL ELECTRODE PEDESTALS

(75) Inventor: Kikuo Ono, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 195 days.

(21) Appl. No.: 12/700,774

(22) Filed: Feb. 5, 2010

(65) Prior Publication Data

US 2010/0245733 A1   Sep. 30, 2010

(30) Foreign Application Priority Data

Mar. 27, 2009   (JP) .................................. 2009-079233

(51) Int. Cl.
  *G02F 1/1339*   (2006.01)
  *G02F 1/1343*   (2006.01)
(52) U.S. Cl. ........................................ 349/155; 349/141
(58) Field of Classification Search .................. 349/141, 349/155–157
  See application file for complete search history.

(56) References Cited

U.S. PATENT DOCUMENTS

| | | | |
|---|---|---|---|
| 6,433,852 B1 * | 8/2002 | Sonoda et al. | 349/156 |
| 6,816,222 B2 | 11/2004 | Ono et al. | |
| 2004/0263752 A1 * | 12/2004 | Kim | 349/141 |
| 2005/0270446 A1 * | 12/2005 | Kim et al. | 349/110 |
| 2006/0125990 A1 * | 6/2006 | Lee et al. | 349/141 |
| 2007/0070281 A1 * | 3/2007 | Choi | 349/141 |

FOREIGN PATENT DOCUMENTS

JP   2002-296615   10/2002

* cited by examiner

*Primary Examiner* — Jessica M Merlin
(74) *Attorney, Agent, or Firm* — Antonelli, Terry, Stout & Kraus, LLP.

(57) ABSTRACT

A liquid crystal display device includes a TFT substrate and a counter substrate with liquid crystal sandwiched therebetween. Support columns which project toward the TFT substrate are formed on the counter substrate. A plurality of gate signal lines, a plurality of drain signal lines, thin film transistors, an insulation film which covers the thin film transistors, organic films which are arranged on the insulation film, and a transparent electrode which constitutes a common electrode arranged on an upper layer of the organic films, are formed on the TFT substrate. A metal film which constitutes a common electrode auxiliary line is arranged on an upper layer of the transparent electrode. The insulation film, the organic films, the transparent electrode, and the metal film are laminated in this order on the gate signal lines, and portions of the metal film arranged on the transparent electrode form pedestals corresponding to the support columns.

5 Claims, 7 Drawing Sheets

LIQUID CRYSTAL DISPLAY WITH SPACERS ARRANGED CORRESPONDING TO METAL ELECTRODE PEDESTALS

The present application claims priority from Japanese application JP2009-079233 filed on Mar. 27, 2009, the content of which is hereby incorporated by reference into this application.

BACKGROUND OF THE INVENTION

1. Field of the Invention

The present invention relates to a liquid crystal display device and a manufacturing method thereof, and more particularly to a liquid crystal display device in which a predetermined distance is held between a TFT substrate and a counter substrate by a support column system and a manufacturing method thereof.

2. Background Art

In a liquid crystal display device, liquid crystal is filled in a space formed between a TFT substrate on which pixel electrodes and thin film transistors (TFT) are formed and a counter substrate on which color filters and the like are formed, and images are formed by controlling molecules of the liquid crystal by an electric field. The distance (cell gap) between the TFT substrate and the counter substrate is extremely narrow, that is, several microns. Accordingly, proper setting of the distance between the TFT substrate and the counter substrate is extremely important for controlling transmissivity of light through the liquid crystal.

As an example of a method for setting a distance between a TFT substrate and a counter substrate, there has been known a method which distributes beads or the like in the space formed between the substrates. However, in distributing the beads in the space, the beads are distributed to regions where pixel electrodes are formed and hence, there arises a drawback that light is scattered in such portions thus lowering a contrast.

On the other hand, with respect to a conventional liquid crystal filling method, there has been developed a method in which a space defined between a TFT substrate and a counter substrate is sealed, an opening is formed in a portion of a sealing material, and liquid crystal is filled in the space through the opening, a method in which a necessary amount of liquid crystal is dropped on a TFT substrate and, thereafter, a counter substrate is adhered to the TFT substrate in a sealed manner thus sealing liquid crystal in the space, and the like. In any one of these methods, in distributing beads in the space, the beads move in the space at the time of dropping the liquid crystal into the space and hence, the number of beads becomes large in some places of the space and the number of beads becomes small in other places of the space. Further, the beads are also distributed into the inside of pixel regions where light emitted from a backlight passes thus actually lowering a numerical aperture of a liquid crystal display device or giving rise to a possibility of lowering of the numerical aperture of the liquid crystal display device.

As a method which defines a distance between the TFT substrate and the counter substrate, besides the above-mentioned example which makes use of the beads, there has been known a method which forms support columns formed of an organic film on the counter substrate (support column system). The support columns are mounted on portions of the counter substrate where the pixel electrodes are not present, that is, portions of the counter substrate through which light from the back light does not pass in general. Accordingly, there is no possibility that brightness (numerical aperture) is lowered due to the presence of the support columns. Further, the support columns are fixed to the counter substrate and hence, there is no possibility that the support columns move even when liquid crystal is dropped. Accordingly, the method which maintains the distance between the TFT substrate and the counter substrate using the support columns is also preferably applicable to a system which drops liquid crystal (liquid crystal dropping sealing system).

On the other hand, there has been known a COA (Color Filter on Array)-type liquid crystal display device which forms color filters on a TFT substrate. JP-A-2002-296615 (corresponding U.S. Pat. No. 6,816,222) (patent document 1) discloses such an example.

When the support column system is adopted by the COA-type liquid crystal display device, support columns are formed on a surface of a counter substrate on which a black matrix is formed, and the support columns are brought into contact with a TFT substrate on which color filters are formed. Here, to properly maintain a distance between the counter substrate and the TFT substrate, and also to prevent the support columns from slipping on a surface of the TFT substrate, pedestals which are brought into contact with the support columns are formed on the TFT substrate.

SUMMARY OF THE INVENTION

The pedestals formed on the TFT substrate are usually formed by making use of a metal film or a semiconductor layer. However, to suppress the occurrence of deterioration of image quality attributed to display irregularities or the like, it is preferable to decrease an area of the pedestal. When the area of the pedestal is decreased to achieve such an end, the color filter is formed on the TFT substrate and the pedestal is formed above the color filter and hence, the pedestal is pushed by the support column so that the color filter is depressed thus giving rise to a phenomenon where the pedestal sinks. Accordingly, it becomes difficult to maintain the distance between the TFT substrate and the counter substrate at a proper amount.

This is because the color filter is formed using a resin which contains pigment and hence, the color filter is softer than a metal film which forms the pedestal. The occurrence of such a phenomenon is not limited to the COA-type liquid crystal display device, and the phenomenon constantly occurs in any liquid crystal display device where organic films are formed on a TFT substrate and pedestals are formed on the organic films.

The present invention has been made to overcome the above-mentioned drawbacks, and it is an object of the present invention to provide a liquid crystal display device which can properly maintain a distance between a TFT substrate and a counter substrate even when an organic film which constitutes color filters or the like is formed on a TFT substrate and pedestals are formed on the organic film.

To overcome the above-mentioned drawbacks, according to the present invention, by arranging a transparent electrode below a metal film which constitutes a pedestal, pressure applied to the pedestal can be dispersed thus preventing the pedestal from sinking also on an organic film. To explain specific means of the present invention, they are as follows.

(1) In a liquid crystal display device which includes a TFT substrate, a counter substrate and liquid crystal sandwiched between the TFT substrate and the counter substrate, support columns which project toward a TFT substrate are formed on the counter substrate, thin film transistors, an insulation film which covers the thin film transistors, organic films which are arranged on the insulation film, and a transparent electrode which constitutes a common electrode and is arranged on portions of organic films are formed on the TFT substrate, at least portions of the transparent electrode include a metal film which constitutes a common electrode auxiliary line respectively, and portions of the metal film which are arranged on the transparent electrode form pedestals corresponding to the support columns.

(2) In the liquid crystal display device having the constitution (1), the organic film is a color filter.

(3) In the liquid crystal display device having the constitution (1), a black matrix is formed on the counter substrate, and the support columns are arranged such that the support columns fall within a black matrix forming region of the counter substrate.

(4) In the liquid crystal display device having the constitution (1), gate signal lines are formed on the TFT substrate, the common electrode auxiliary lines are arranged along the gate signal lines, and the pedestal is formed of the metal film which is arranged in the inside of an opening portion formed in the common electrode auxiliary line in an island shape.

(5) In the liquid crystal display device having the constitution (1), gate signal lines are formed on the TFT substrate, source electrodes of the thin film transistors are formed such that the source electrodes fall within gate-signal-line forming region of the TFT substrate, and a portion of the transparent electrode which constitutes the pixel electrode is connected with the source electrode via a through hole which penetrates the transparent electrode constituting the common electrode, the organic film and the insulation film.

According to the present invention, in the above-mentioned constitution (1), the thin film transistors, the insulation film which covers the thin film transistors, the organic films which are arranged on the insulation film, and the transparent electrode which constitutes the common electrode and is arranged on portions of the organic films are formed on the TFT substrate, at least portions of the transparent electrode include a metal film which constitutes a common electrode auxiliary line, and portions of the metal film which are arranged on the transparent electrode form pedestals corresponding to the support column. In this manner, the transparent electrode is arranged below the pedestals formed of the metal film and hence, pressure applied to the pedestal from the support column can be dispersed whereby sinking of the pedestal into the organic film can be suppressed. Accordingly, it is possible to always maintain a proper distance between the counter substrate and the TFT substrate.

Further, the pedestal is formed by making use of the metal film which constitutes the common electrode auxiliary line, and the transparent electrode which is arranged below the pedestal is also formed by making use of the transparent electrode which constitutes the common electrode. Accordingly, it is possible to easily realize the present invention by merely adjusting a mask pattern relating to the pedestal or the like in a usual manufacturing step without making manufacturing steps of the liquid crystal display device complicated.

Due to the above-mentioned constitution (2) where the organic film is the color filter, the present invention is also preferably applicable to the COA-type liquid crystal display device.

According to the present invention, due to the above-mentioned constitution (3) where the black matrix is formed on the counter substrate and the support columns are arranged to fall within the black matrix forming region, there is no possibility that image quality is deteriorated due to the presence of the support columns.

According to the present invention, due to the above-mentioned constitution (4) where the gate signal lines are formed on the TFT substrate, the common electrode auxiliary lines are arranged along the gate signal lines, and the pedestals are formed of the metal film which is arranged in the inside of the opening portions formed in the common electrode auxiliary line in an island shape, the metal film which constitutes the pedestals easily reflects light emitted from a backlight and hence, there exists a large possibility that image quality is influenced by the light. However, in the present invention, the light which may be incident on the pedestal is blocked by the gate signal line and hence, the deterioration of image quality can be suppressed. Further, an area of the pedestal can be increased within a range of an area which the gate signal line occupies and hence, it is possible to provide the pedestals which is difficult to sink by using the organic film is used.

According to the present invention, due to the above-mentioned constitution (5) where the gate signal lines are formed on the TFT substrate, the source electrodes of the thin film transistors are formed to fall within the gate-signal-line forming region, and the portion of the transparent electrode which constitutes the pixel electrode is connected with the source electrode via the through hole which penetrates the transparent electrode constituting the common electrode, the organic film and the insulation film and hence, an area of the through hole can be increased within a range of an area which the gate signal line occupies whereby the resistance in conduction between the pixel electrode and the source electrode can be lowered by upsizing of the through hole, and the reliable conduction can be realized between the pixel electrode and the source electrode.

DESCRIPTION OF THE PREFERRED EMBODIMENTS

A liquid crystal display device according to the present invention is explained in detail hereinafter.

Figure 8:
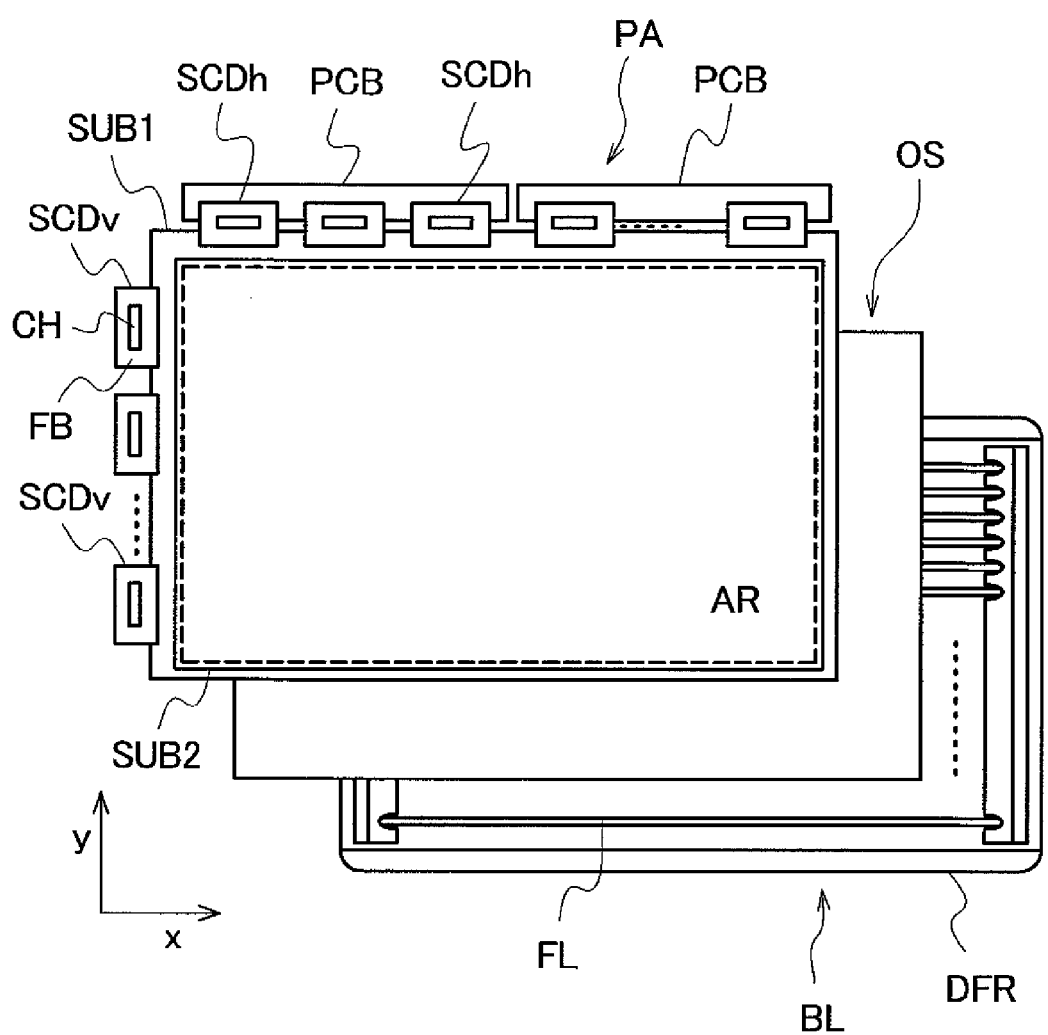
FIG. 8 is a schematic view showing the overall constitution of the liquid crystal display device according to the present invention.

FIG. 8 is a schematic constitutional view showing the liquid crystal display device to which the present invention is applied. A liquid crystal display panel PA, an optical sheet OS and a backlight BL are sequentially arranged as viewed from a viewer's side.

The liquid crystal display panel PA includes a pair of substrates SUB1, SUB2 which is arranged parallel to each other and is made of glass, for example. Liquid crystal is sealed in a space defined between the respective substrates SUB1, SUB2.

Figure 2:
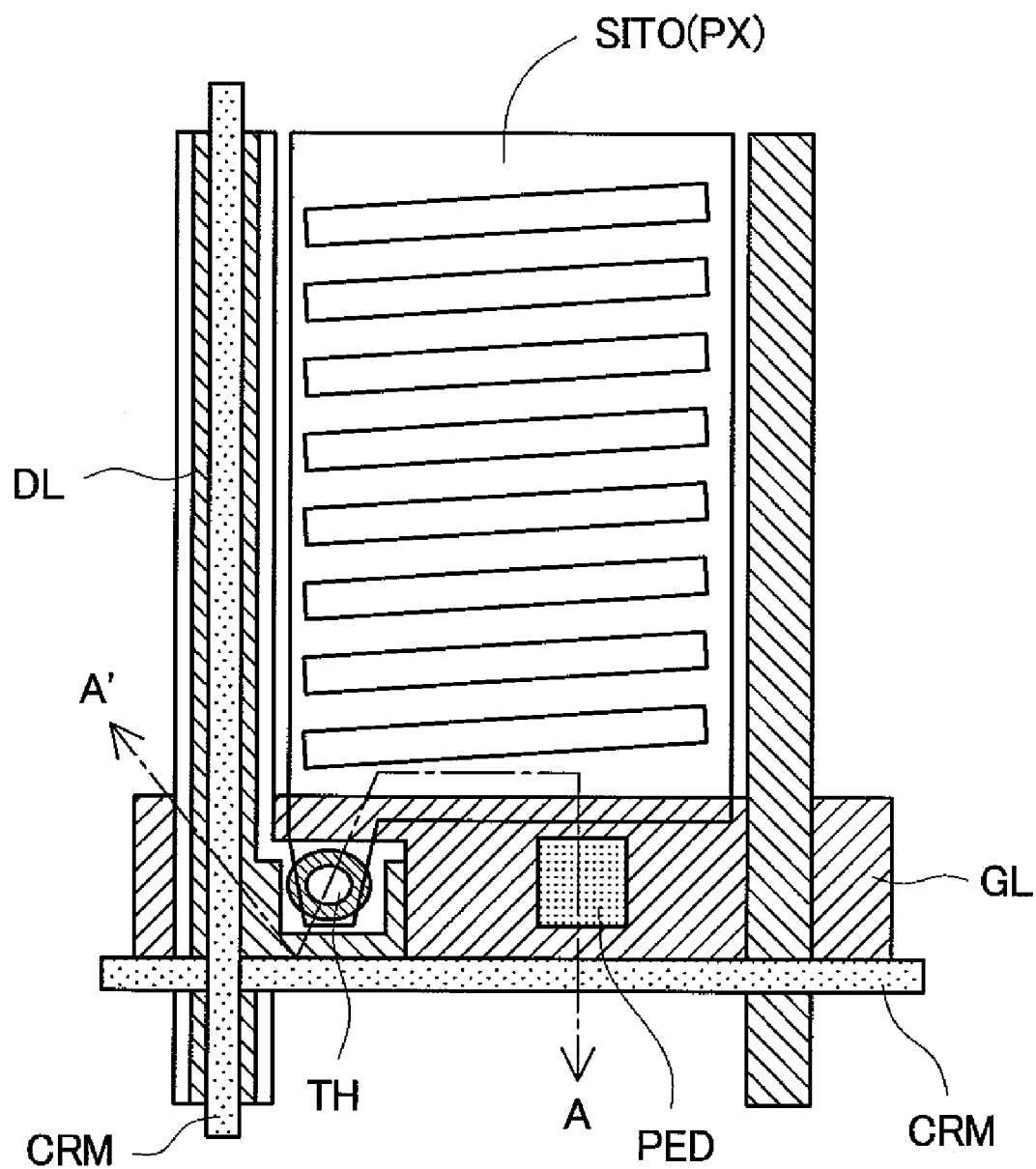
FIG. 2 is a plan view showing a portion of a TFT substrate used in the liquid crystal display device according to the first embodiment of the present invention.
Figure 5:
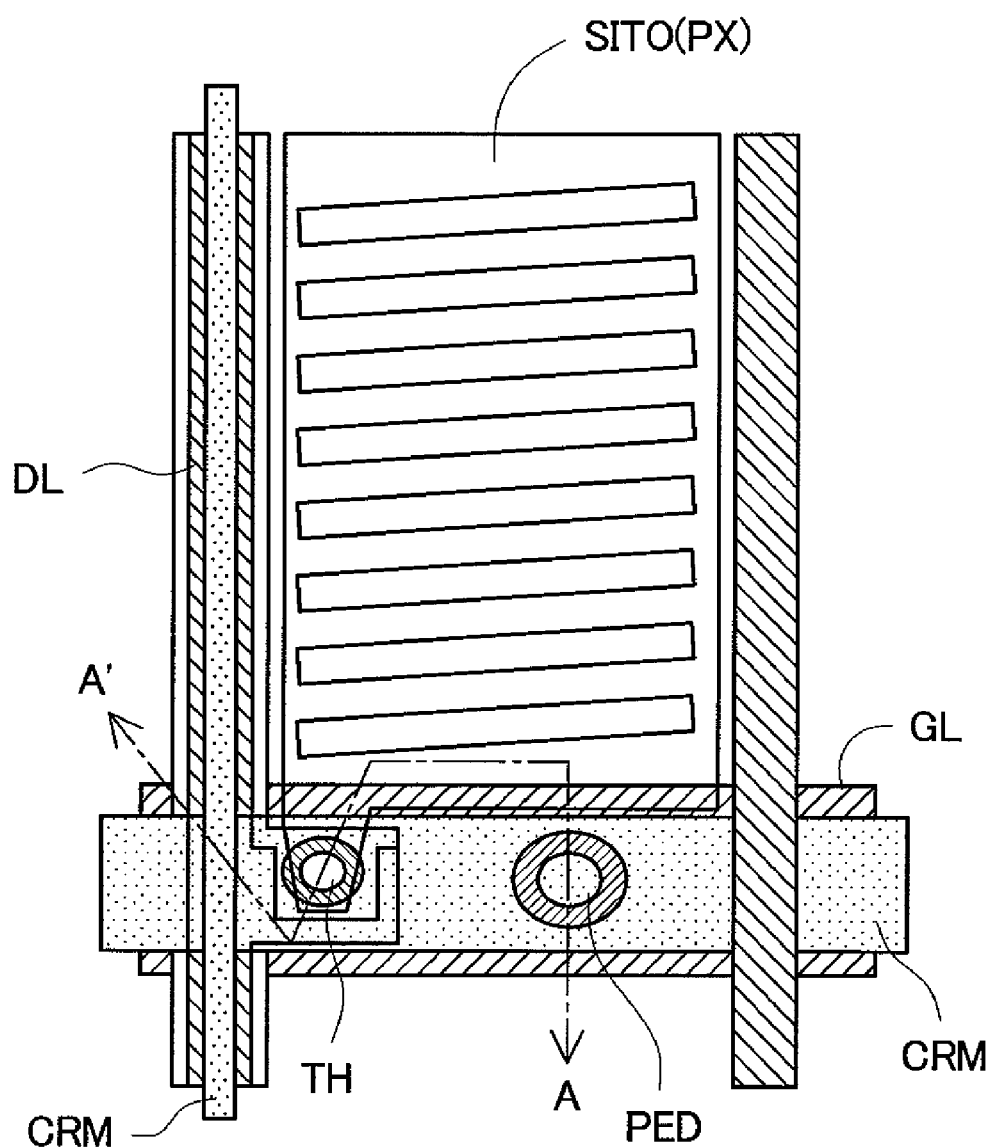
FIG. 5 is a plan view showing a portion of a TFT substrate used in a liquid crystal display device according to a second embodiment of the present invention.

On liquid-crystal-side surfaces of the substrates SUB1, SUB2, pixels which are arranged in a matrix array are formed (see FIG. 2 or FIG. 5). Transmissivity of liquid crystal can be controlled for every pixel.

A region where these respective pixels are formed constitutes an image display region AR (a region surrounded by a chained line in the drawing). Light emitted from the backlight BL is radiated to the whole image display region AR, and a viewer can recognize an image by means of lights which pass through the respective pixels.

The substrate SUB1 which is arranged behind the substrate SUB2 as viewed from a viewer's side includes portions which are exposed from the substrate SUB2 on a left side and an upper side in the drawings, for example. A plurality of driver printed circuit boards SCDh, SCDv are connected to these portions. The driver printed circuit boards SCDh, SCDv are respectively formed by a TCP (Tape Carrier Package) which is a so-called TAB (Tape Automated Bonding), a COF (Chip on Film) or other technique. The driver printed circuit boards SCDh, SCDv are respectively constituted by mounting a semiconductor chip CH on an upper surface of a flexible printed circuit board FB on which lines are formed.

These respective driver printed circuit boards SCDh, SCDv are circuits for driving the respective pixels independently. For example, the driver printed circuit boards SCDv which are arranged parallel to each other in the y direction in the drawing are scanning signal drive circuits, and the driver printed circuit boards SCDh which are arranged parallel to each other in the x direction in the drawing are video signal drive circuits.

To the plurality of driver printed circuit boards SCDh which constitute the video signal drive circuits, printed circuit boards PCB are connected on a side opposite to sides of the driver printed circuit boards SCDh which are connected to the substrate SUB1, and external input signals are inputted to the respective driver printed circuit boards SCDh via printed circuit boards PCB.

Here, external input signals are inputted to the plurality of driver printed circuit boards SCDv which constitute the scanning signal drive circuits through lines which are formed on a surface of the substrate SUB1 (not shown in the drawing) and hence, the driver printed circuit board SCDv is not provided with a circuit board corresponding to a printed circuit board PCB.

On a back surface of the liquid crystal display panel PA having such a constitution, the backlight BL is arranged by way of an optical sheet means (optical member) OS which is constituted of a stacked body formed by stacking a prism sheet, a diffusion plate and the like, for example. The optical member OS diffuses and focuses light emitted from the backlight BL and guides the light toward the liquid crystal display panel PA.

The backlight BL shown in FIG. 8 is a so-called direct backlight, and is configured such that a plurality of fluorescent tubes FL which are linear light sources are arranged parallel to each other in a box-shaped casing (frame member DFR). In place of the backlight BL formed of the fluorescent tubes FL, it is possible to use a backlight in which spot light sources such as light emitting diodes are arranged in plane.

Figure 9:
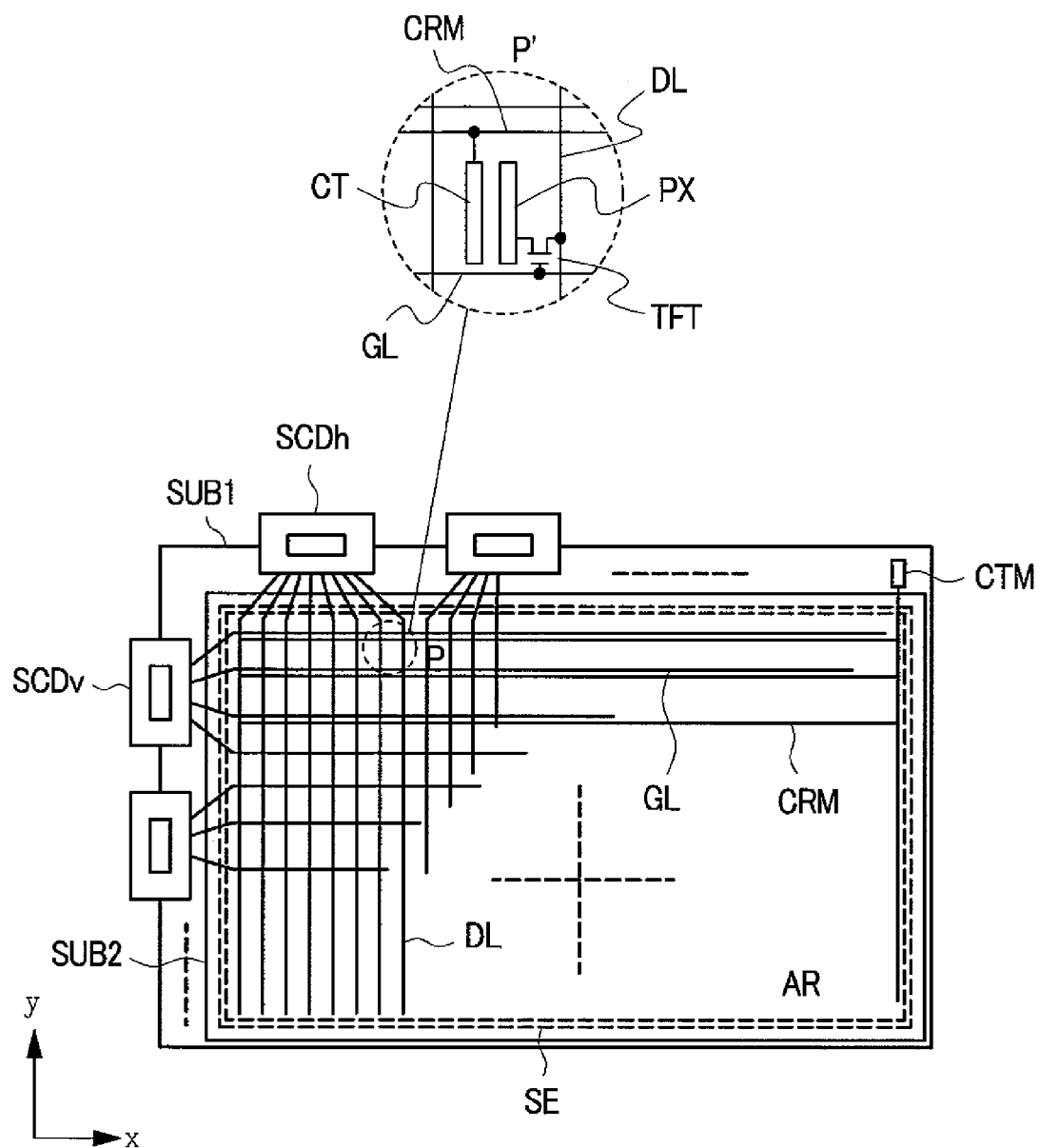
FIG. 9 is a schematic view showing the overall constitution of the liquid crystal display panel used in the liquid crystal display device according to the present invention.

Next, electrodes and lines which are formed on the substrate SUB1 are explained in conjunction with FIG. 9. The substrate SUB1 has a larger area than the substrate SUB2. For example, the substrate SUB1 includes regions which are exposed from the substrate SUB2 on a left side portion and an upper side portion in the drawing.

In a region on the left side portion of the substrate SUB1, the plurality of driver printed circuit boards SCDv (scanning signal drive circuits) are arranged parallel to each other. In a region on the upper side portion of the substrate SUB1, the plurality of driver printed circuit boards SCDh (video signal drive circuits) are arranged parallel to each other. The driver printed circuit board SCDv constitutes the scanning signal drive circuit and is connected to gate signal lines GL. The driver printed circuit board SCDh constitutes the video signal drive circuit and is connected to drain signal lines DL.

On a liquid-crystal-side surface of the substrate SUB1 and within the liquid crystal display region AR, the gate signal lines GL which extend in the x direction and are arranged parallel to each other in the y direction in the drawing, and the drain signal lines DL which extend in the y direction and are arranged parallel to each other in the x direction in the drawing are formed.

A rectangular region which is surrounded by a pair of neighboring gate signal lines GL and a pair of neighboring drain signal lines DL constitutes a region in which a pixel is formed. Accordingly, the respective pixels are arranged in a matrix array within the liquid crystal display region AR.

Left end portions of the respective gate signal lines GL get over the sealing material SE and extend to the outside of the liquid crystal display region AR, and are connected to output terminals of the driver printed circuit boards SCDv arranged adjacent to the left end portions of the gate signal lines GL. Scanning signals (voltages) are supplied to the gate signal lines GL from the driver printed circuit boards SCDv.

Upper end portions of the respective drain signal lines DL get over the sealing material SE, extend to the outside of the liquid crystal display region AR, and are connected to output terminals of the driver printed circuit boards SCDh arranged adjacent to the upper end portions of the drain signal lines DL. Video signals (voltages) are supplied to the drain signal lines DL from the driver printed circuit boards SCDh.

The pixel includes, as shown in a circle frame P' which is an enlarged view of a circle frame P in the drawing, for example, a thin film transistor TFT which is turned on in response to a scanning signal (voltage) from the gate signal line GL, a pixel electrode PX to which a video signal (voltage) is supplied from the drain signal line DL via the thin film transistor TFT in an ON state, and a common electrode CT to which a fixed reference signal (voltage) is applied and which generates an electric field by making use of the potential difference between the pixel electrode PX and the common electrode CT. More specific constitutional example of the pixel is explained in conjunction with FIG. 2 or FIG. 7.

Both the pixel electrodes PX and the common electrodes CT are formed on the same substrate SUB1. The above-mentioned electric field contains an electric-field component which is parallel to a surface of the substrate SUB1 as a portion thereof. A driving method which generates the behavior of liquid crystal molecules (or drives liquid crystal molecules) by making use of such an electric field is referred to as IPS (In-Plane-Switching) driving.

Here, the common electrode CT of the present invention is formed in plane while extending over a plurality of pixels. Aiming at lowering a resistance, common electrode auxiliary lines CRM are stacked on the common electrode CT. Further, the common electrode auxiliary lines CRM extend beyond the sealing material SE and are connected to a common voltage terminal CTM which is formed on a surface of the substrate SUB1.

Figure 1:
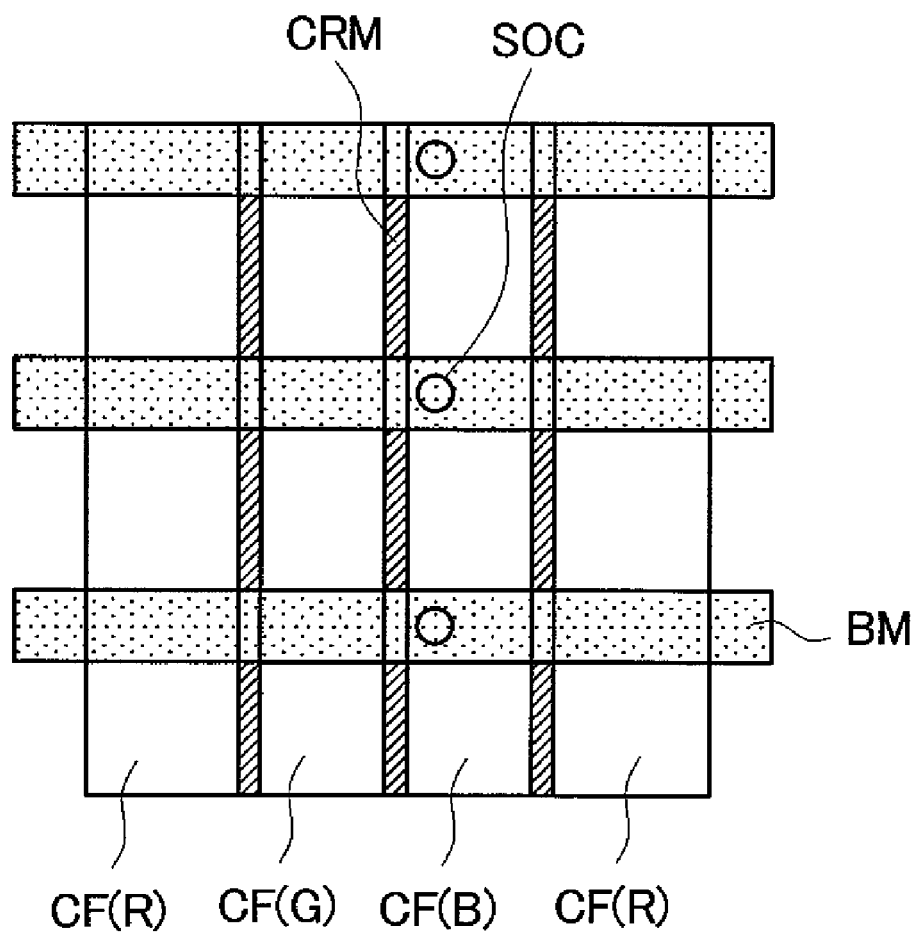
FIG. 1 is a view for explaining the arrangement of support columns with respect to color filters and a black matrix in a liquid crystal display device according to a first embodiment of the present invention.

FIG. 1 is a view for explaining the arrangement of support columns with respect to the color filters and the black matrix. The black matrix BM is formed on the counter substrate SUB2, and the color filters (red color filters CF (R), green color filters CF (G), blue color filters CF (B)) are formed on the TFT substrate SUB1.

As shown in FIG. 1, support columns SOC which define a distance between the counter substrate SUB2 and the TFT substrate SUB1 are arranged to fall within a region where the black matrix BM is formed and hence, there is no possibility that image quality is deteriorated due to the presence of the support columns SOC. Further, a transparent electrode (not shown in the drawing) which constitutes the common electrode is arranged over the color filters, and the common electrode auxiliary lines CRM are arranged over the transparent electrode for lowering the electric resistance which is generated when a voltage is applied to the common electrode.

Embodiment 1

Figure 3:
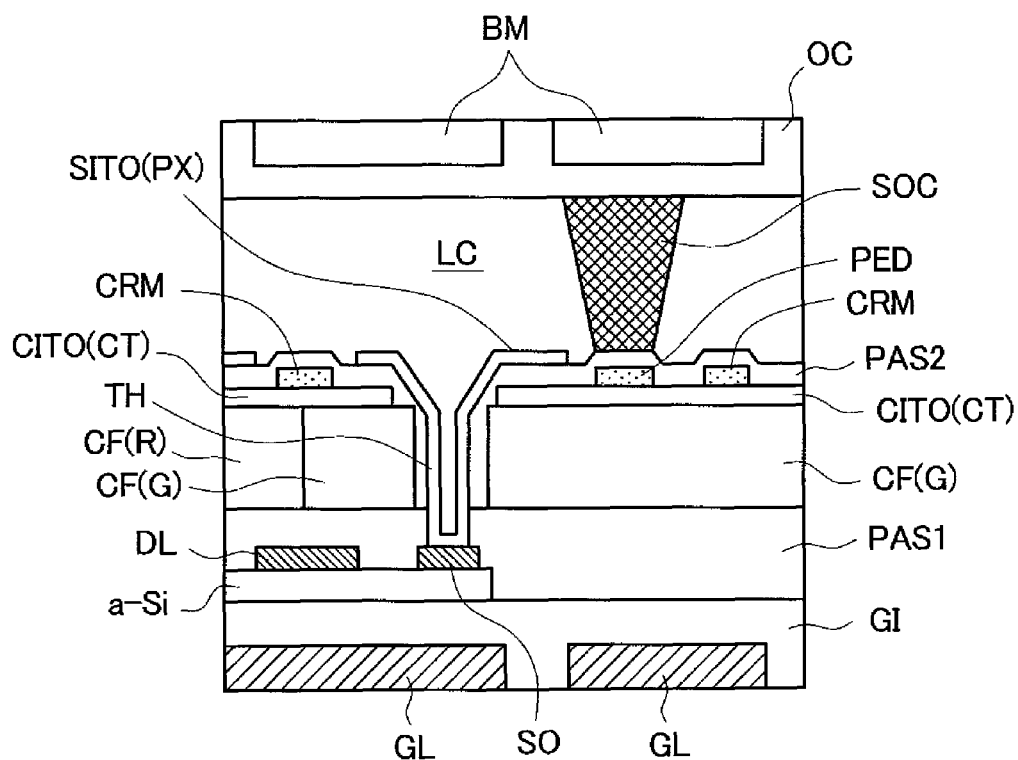
FIG. 3 is a cross-sectional view taken along a line A-A' in FIG. 2.
Figure 4:
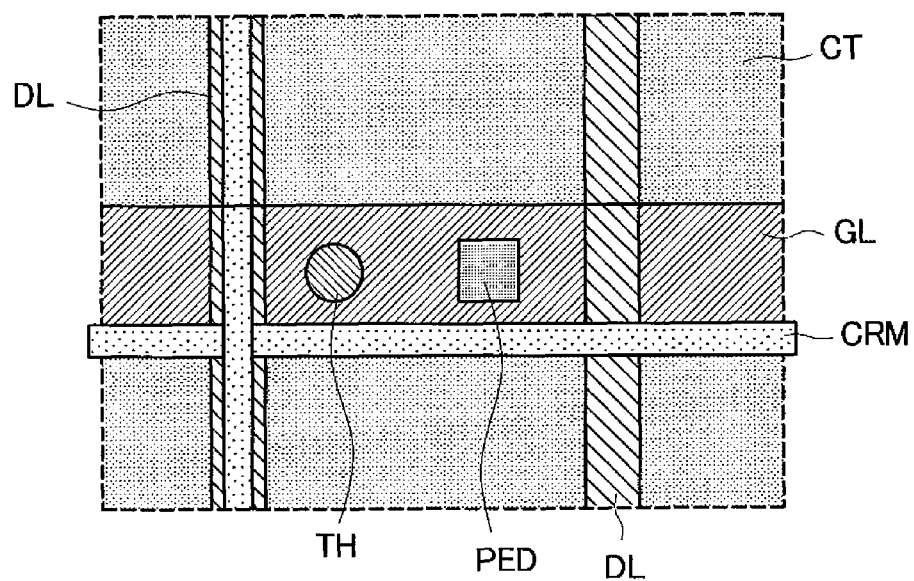
FIG. 4 is a view for explaining shapes of a common electrode and a common electrode auxiliary line used in the liquid crystal display device according to the first embodiment of the present invention.

Next, the liquid crystal display device according to the embodiment 1 of the present invention is explained in conjunction with FIG. 2 to FIG. 4. FIG. 2 is a plan view showing a portion of the TFT substrate, and FIG. 3 is a cross-sectional view of the liquid crystal display device taken along a line A-A' in FIG. 2.

As shown in FIG. 3, the support columns SOC are arranged on a surface of a leveling layer OC which covers the black matrix BM arranged on a surface of the counter substrate SUB2 not shown in the drawing in a state where the support columns SOC face the TFT substrate SUB1 in an opposed manner. On a surface of the leveling layer OC, an alignment film (not shown in the drawing) for controlling the alignment of liquid crystal LC is formed.

To explain a method of manufacturing the support columns SOC, a photosensitive resin is applied to an upper surface of the leveling layer OC, and is dried by heating. Then, the photosensitive resin is exposed using a mask pattern which has a light transmitting portion at portions thereof corresponding to positions where the support columns are formed. Subsequently, the photosensitive resin is developed so as to remove unexposed portions thus forming a support column pattern. By curing the support column pattern by baking, the support columns are formed.

On a TFT substrate side which is brought into contact with the support columns SOC, pedestals PED which are formed of a metal film are formed. The constitution of the TFT substrate is explained in detail hereinafter. On a surface of the substrate SUB1 (not shown in the drawing), the gate signal lines GL are formed. A gate insulation film GI is formed on the gate signal lines GL so as to cover the gate signal lines GL. A semiconductor film a-Si made of amorphous silicon which constitutes a thin film transistor is formed on the gate insulation film GI. A source electrode SO is formed on an upper surface of the semiconductor film a-Si. The drain signal line DL is formed on the semiconductor film a-Si and the gate insulation film GI. As a protective film which covers the thin film transistor and the drain signal line DL, an insulation film PAS1 made of SiN or the like is arranged over the thin film transistor and the drain signal line DL.

Color filters (CF(R), CF(G) and the like) are arranged on the insulation film PAS1 corresponding to the respective pixels, and a transparent electrode CITO which constitutes the common electrode CT is arranged on upper surfaces of the color filters. As a material of the transparent electrode, ITO or the like may preferably be used. The common electrode CT extends over and overlaps with a plurality of pixel regions which are defined by the gate signal lines GL and the drain signal lines DL. Basically, the common electrode CT overlaps with not only the pixel electrodes PX but also the gate signal lines GL and the drain signal lines DL. Further, the transparent electrode which constitutes the common electrode CT exhibits high electric resistance and hence, to decrease the electric resistance when a voltage is applied to the transparent electrode, the common electrode auxiliary lines CRM which is formed of a metal film are formed on the transparent electrode CITO.

In the liquid crystal display device of the present invention, to form the pedestals PED, a metal film which is used for forming the common electrode auxiliary line CRM is used. Further, the transparent electrode CITO which is used as the common electrode is arranged below the pedestal PED. Due to such a constitution, as shown in FIG. 3, even when the pressing force is applied to the pedestal PED from the support column SOC, the pressure is dispersed by the transparent electrode CITO arranged below the pedestal PED and hence, it is possible to suppress sinking of an organic film which constitutes the color filter CF(G) and the like. Accordingly, the pedestal PED does not sink into the color filter CF(G) so that it is possible to always maintain a proper distance between the counter substrate SUB2 and the TFT substrate SUB1.

The pedestals PED can be formed simultaneously with the common electrode auxiliary lines CRM. Further, the transparent electrodes which are arranged below the pedestals PED also can be formed simultaneously with the formation of the transparent electrode CITO which constitutes the common electrode CT. Accordingly, the present invention can be carried out without making manufacturing steps of the liquid crystal display device complicated.

For protecting the common electrode CT and the common electrode auxiliary lines CRM, an insulation film PAS2 made of SiN or the like is arranged over the common electrode CT and the common electrode auxiliary lines CRM. As shown in FIG. 2, over the insulation film PAS2, the pixel electrodes PX each of which includes a plurality of opening portions are formed using a transparent electrode SITO. Further, on a surface of the TFT substrate which is in contact with liquid crystal, an alignment film (not shown in the drawing) for controlling the alignment direction of liquid crystal is formed.

As shown in FIG. 3, the transparent electrode SITO which constitutes the pixel electrode PX is connected to the source electrode SO of the thin film transistor via a through hole TH. The insulation film PAS2, the common electrode CT, the color filters CF and the insulation film PAS1 respectively have an opening portion on the periphery of the through hole TH.

FIG. 4 shows a state of the common electrode CT on the periphery of the gate signal line GL (the source electrode and the drain electrode of the thin film transistor TFT being omitted from the drawing).

Although the common electrode CT according to the present invention extends over the whole surface of the display region in plane while covering the plurality of pixel regions, as shown in FIG. 4, an opening portion is formed in portions of the common electrode CT which overlap with the through holes TH. Further, to realize lowering of resistance, the common electrode auxiliary lines CRM formed of a metal film are formed on portions of the common electrode CT which overlap with the gate signal lines GL and the drain signal lines DL.

Embodiment 2

Figure 6:
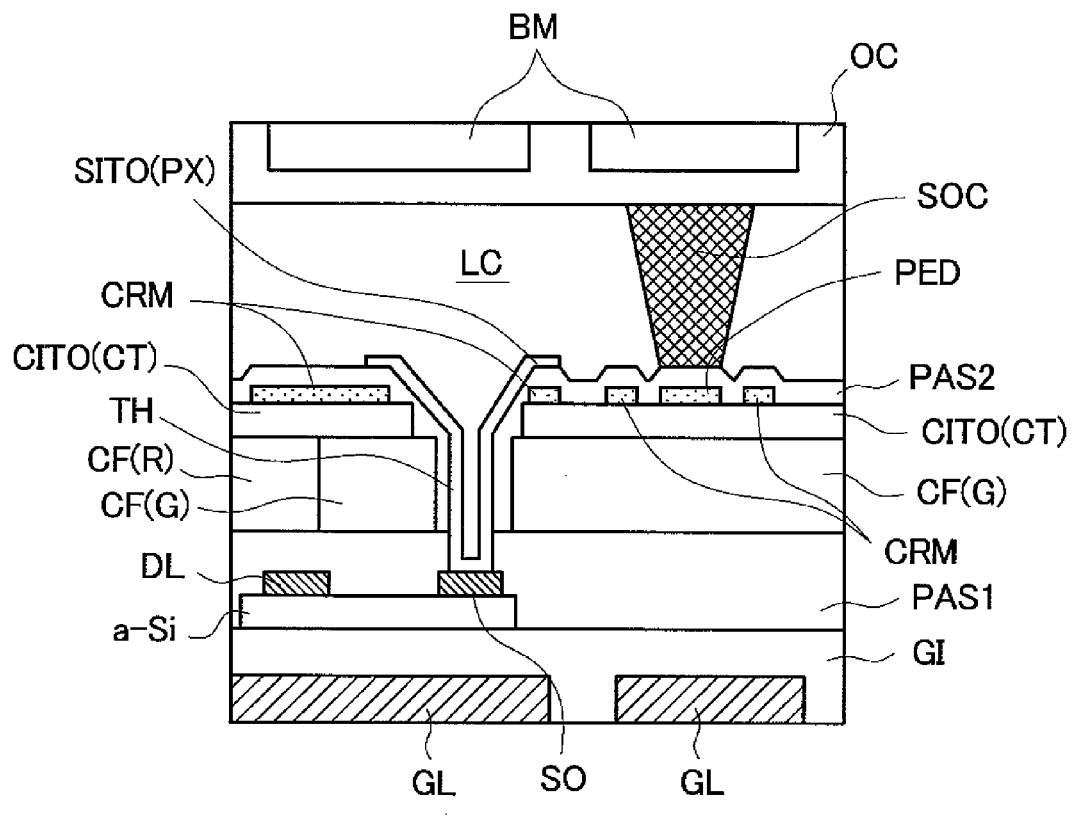
FIG. 6 is a cross-sectional view taken along a line A-A' in FIG. 5.
Figure 7:
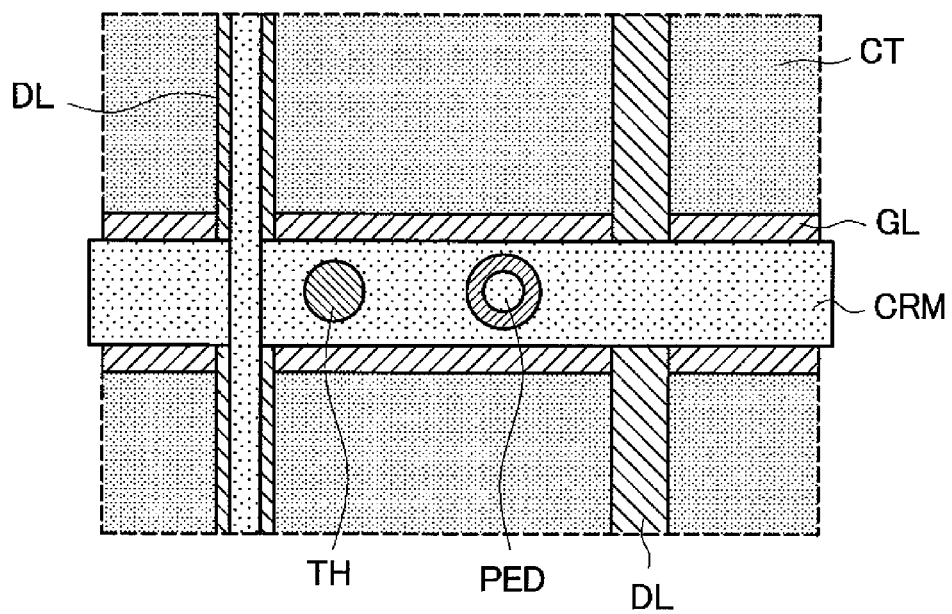
FIG. 7 is a view for explaining shapes of a common electrode and a common electrode auxiliary line used in the liquid crystal display device according to the second embodiment of the present invention.

A liquid crystal display device according to the embodiment 2 of the present invention is explained in conjunction with FIG. 5 to FIG. 7.

FIG. 5 is a plan view of the liquid crystal display device showing a portion of a TFT substrate in the same manner as FIG. 2. FIG. 6 is a cross-sectional view taken along a line A-A' in FIG. 5. FIG. 7 is a view showing a state of a common electrode CT on the periphery of a gate signal line GL in the same manner as FIG. 4.

The technical feature of the second embodiment lies in that, as shown in FIG. 5 and FIG. 7, a width of a common electrode auxiliary line CRM which is arranged along a gate signal line GL formed on a TFT substrate SUB1 is increased such that the width becomes substantially equal to a width of the gate signal line GL. A pedestal PED is arranged inside an opening portion formed in the common electrode auxiliary line CRM in an island shape. Further, an opening portion is also formed in a portion of the common electrode auxiliary line CRM corresponding to a through hole TH. Due to such a constitution, it is possible to further lower electric resistance of the common electrode CT and the common electrode auxiliary line CRM by an amount corresponding to the increase of a width of the common electrode auxiliary line CRM.

A metal film which constitutes a pedestal PED is liable to reflect light emitted from a backlight and hence, there exists large possibility that image quality is influenced by the light. However, according to this embodiment, the light which may incident on the pedestal PED is blocked by the gate signal line GL and hence, the deterioration of image quality can be suppressed. Further, an area of the pedestal PED can be increased within a range of an area which the gate signal line GL occupies and hence, an organic film which constitutes a color filter CF(G) and the pedestal PED hardly sink.

Other constitutions of this embodiment are substantially equal to the constitutions of the above-mentioned embodiment 1, and numerals and symbols used in FIG. 5 to FIG. 7 have substantially same meanings as numerals and symbols used in FIG. 2 to FIG. 4.

INDUSTRIAL APPLICABILITY

As has been explained heretofore, according to the present invention, it is possible to provide a liquid crystal display device which can properly maintain the distance between the TFT substrate and the counter substrate even when the organic film which constitutes color filters or the like is formed on the TFT substrate and the pedestals are formed on the organic film.

What is claimed is:

1. A liquid crystal display device comprising a TFT substrate, a counter substrate and liquid crystal sandwiched between the TFT substrate and the counter substrate, wherein
    support columns which project toward the TFT substrate are formed on the counter substrate,
    a plurality of gate signal lines, a plurality of drain signal lines, thin film transistors, an insulation film which covers the thin film transistors, organic films which are arranged on the insulation film, and a transparent electrode which constitutes a common electrode arranged on an upper layer of the organic films are formed on the TFT substrate,
    a metal film which constitutes a common electrode auxiliary line is arranged on an upper layer of the transparent electrode,
    the insulation film, the organic films, the transparent electrode, and the metal film are laminated in this order on the gate signal lines, and
    portions of the metal film arranged on the upper layer of the transparent electrode form pedestals corresponding to the support columns, the portions of the metal film forming the pedestals being electrically insulated with respect to the metal film of the common auxiliary line.

2. A liquid crystal display device according to claim 1, wherein the organic films include a color filter, the transparent electrode being arranged on an upper layer of the color filter.

3. A liquid crystal display device according to claim 1, wherein a black matrix is formed on the counter substrate, and the support columns are arranged such that the support columns fall within a black matrix forming region of the counter substrate.

4. A liquid crystal display device according to claim 1, wherein the common electrode auxiliary lines are arranged along the gate signal lines, and the pedestal is formed of the portions of the metal film arranged in the inside of an opening portion formed in the common electrode auxiliary line in an island shape.

5. A liquid crystal display device according to claim 1, wherein source electrodes of the thin film transistors are formed such that the source electrodes fall within gate-signal-line forming region of the TFT substrate, and a portion of the transparent electrode which constitutes the pixel electrode is connected with the source electrode via a through hole which penetrates the transparent electrode constituting the common electrode, the organic films and the insulation film.

* * * * *